Patented July 1, 1947

2,423,388

UNITED STATES PATENT OFFICE 2,423,388

METHOD FOR PURIFYING STYRENE

Claude W. Jordan, Paoli, Pa., assignor to The United Gas Improvement Company, a corporation of Pennsylvania No Drawing. Application June 17, 1941, Serial No. 398,403

1 Claim. (Cl. 260—669)

This invention pertains generally to the purification of styrene, and pertains particularly to the purification of styrene obtained from light oil.

More specifically, this invention pertains to the purification of styrene by the application of metals in group IA and group IIA of the periodic table, or certain derivatives thereof.

It is an object of the present invention to purify styrene by the use of one or more alkali or alkaline earth metals under carefully controlled conditions. Another object of the invention is the provision of certain methods whereby styrene may be purified by the application of one or more alkali or alkaline earth metals without undue loss of styrene in the form of styrene polymers of low quality.

Other objects of the invention will be apparent to those skilled in the art from an inspection of the following description and claims.

In the various processes for the manufacture of artificial gas such as oil gas, carburetted water gas, or coal gas, considerable quantities of tar are produced, and the gas contains substantial quantities of readily condensible materials.

These condensates, as well as the light oil obtained upon distillation of the tar, are sources for many hydrocarbons. In particular, these condensates are excellent sources of styrene.

With ordinary methods of fractional distillation as now practiced, it is impossible to separate many of these unsaturated compounds in a substantially pure state because of the presence of other materials which apparently are either of similar boiling point or are capable of forming azeotropic mixtures with the desired hydrocarbon. This is especially true in the case of styrene, in which the usual polymerizing difficulties are increased by the pronounced tendency of the material to polymerize during the fractionation process.

This has led to the development of auxiliary methods for increasing the concentration of light oil styrene fractions to the desired extent.

Styrene fractions obtained by the fractionation of light oil according to the usual methods employed in the art, as well as those of lower and higher concentration obtained, for example, by the use of more drastic fractionating methods and/or the use of certain special concentrating methods, are generally suited for the manufacture of synthetic resins by suitable polymerization methods, except that the resulting resins are very often too inferior with respect to color, color stability, electrical resistance, molding properties, freedom from crazing, thermal stability, melting point, specific viscosity, molecular weight, and mechanical strength as to be of any considerable value.

I find that these deficiencies are generally traceable to the presence of certain contaminating materials in the styrene fractions during the polymerizing process.

While I have not as yet exactly determined the character of all of these impurities, experimental evidence indicates that they may be classified in certain specific groups.

For example, a typical styrene fraction obtained from light oil was analyzed and found to contain approximately 0.1% sulfur. This indicates that crude styrene obtained from the above sources contains a relatively large quantity of sulfur-containing materials, such as mercaptans, disulfides, and/or derivatives of thiophene and related compounds.

Another portion was treated with a mercurating solution which resulted in the production of a copious precipitate. Precipitates obtained from different portions of the starting material varied in color from a faint yellow to a light brown. This indicates, among other things, the presence of superaromatic compounds such as substituted thiophene and thiophene homologues.

The treatment of various light oil fractions with ammoniacal cuprous chloride resulted in the formation of a heavy yellow precipitate. This indicates the presence of acetylenic compounds, such as phenyl acetylene. Further work resulted in the isolation of substantial quantities of phenyl acetylene from several light oil styrene fractions, indicating that this material is a principal impurity of light oil styrene.

Similar tests made with pure styrene diluted with xylene to the same concentration as the crude styrene fractions treated above gave results which were negative in each case.

Other types of impurities are doubtless present also, although specific tests have not as yet been devised for their detection. Among these types of impurities may be included oxygenated compounds, organic peroxides and oxides, organic per acids, aldehydes, amines, and other reactive classes of compounds.

An important class of compounds in light oil styrene fractions, from the standpoint of their influence upon the properties of the polystyrene subsequently obtained from such fractions, are the colored compounds which impart a yellow or yellow-brown color to the said fractions. While I have not as yet determined the actual structure of any of these colored compounds, certain evidence indicates that they mainly comprise unsaturated compounds with conjugate systems of double bonds.

As indicated above, it is difficult, if not impossible, to prepare a commercial grade of polystyrene from crude light oil fractions unless at least some of the contaminating impurities are removed.

While the exact influence of each of these contaminating materials is not known, it may be pointed out that they may act (1) as accelerators, resulting in the production of polystyrene of relatively poor quality under polymerizing conditions which would normally result in the production of a good grade of polystyrene; (2) as inhibitors, reducing the quantity of polystyrene obtained under normal polymerizing conditions, and/or (3) they may take part in the reaction and become an integral part of the resin molecule.

The presence of contaminating impurities in the polymer molecule undoubtedly would weaken it, causing the resin to be less stable to heat and to decompose readily with the formation of undesired color bodies.

The highly reactive nature of the styrene present in light oil fractions of the type disclosed makes it extremely difficult to remove the contaminating impurities.

I have found, however, that, by a proper choice of conditions such as temperature, time of contact, method of application, and so forth, the undesired contaminating materials, including color and color-forming compounds, may be removed without a considerable loss of the desired hydrocarbon by the application of one or more metals in groups IA and IIA of the periodic table, either in finely divided form or in the form of solutions or dispersions in suitable solvents or vehicles, or in the form of certain derivatives thereof.

These results are entirely unexpected, as the metals in these groups, which include lithium, sodium, potassium, rubidium, caesium, barium, strontium, and calcium, have long been known as catalysts for the polymerization of styrene. Thus, for example, Ziegler and Kleiner in 1929 extensively investigated the use of these metals as catalysts for the polymerization of styrene (Ziegler & Kleiner, Ann. 473 57 (1929)).

The following examples will serve to illustrate the invention.

*Example 1*

A yellow sample of a crude light oil styrene fraction, obtained by the fractionation of light oil from oil gas and containing 66.3% by weight of monomeric styrene, was polymerized by heating for a period of ten days at a temperature of 100° C. in a sealed glass vessel in an atmosphere of nitrogen. Residual unpolymerized material was removed by distillation under reduced pressure, resulting in the isolation of the polystyrene formed in a yield equivalent to 49.8% by weight of the styrene present in the original sample.

The polystyrene isolated had the following physical properties.

| | |
|---|---|
| Viscosity _____centipoises__ | 10.8 |
| Color _____ | 4.5 |
| Melting point _____°C__ | 175 |
| Toughness _____ | 3.0 |

The viscosity, which may be regarded as a measure of the average molecular weight of the sample, was determined by measuring the viscosity of a 10% solution of the polystyrene in toluene at a temperature of 25° C.

The color of the polystyrene was determined by comparing it with a set of Gardner color standards.

The melting point of the polystyrene was determined by the well known capillary method.

The toughness was measured by comparison with an arbitrary scale in which 1 represents a very brittle polymer and 5 represents a very tough polymer.

*Example 2*

A 269 gram (300 cc.) portion of the same styrene fraction used in Example 1 was placed in a 500 cc. round bottom flask immersed in a cooling bath maintained at a temperature of −39° C., after which 30 cc. of liquid ammonia was added with vigorous agitation. The styrene fraction contained 0.98% by weight of phenylacetylene.

The theoretical quantity of metallic sodium required to react with the 2.64 grams of phenylacetylene present in the fraction being treated is 0.594 gram. However, a considerable larger quantity of sodium normally is employed in order to remove other undesirable impurities present.

A total of two grams of very finely divided sodium was added to the mixture of styrene and liquid ammonia with good agitation, after which the reaction was permitted to continue for a period of 15 minutes. The reaction vessel then was heated to a temperature of 20° C.

The styrene was distilled under a pressure of 3 mm. of mercury, absolute. The distillate was clear, transparent, and water-white in color. The phenylacetylene content of the refined styrene fraction was less than 0.001%.

A total of 280 cc. of refined styrene fraction was recovered. Losses due to the removal of the undesired materials present in the original sample, distillation, and handling amounted to 20 cc., or 6.67% by volume of the original sample.

A portion of this refined, water-white styrene fraction was polymerized in exactly the same manner as that employed in Example 1. The polystyrene was obtained in a yield equivalent to 91.1% by weight of the styrene present in the unpolymerized fraction. The polystyrene sample had the following properties.

| | |
|---|---|
| Viscosity _____centipoises__ | 35.2 |
| Color _____ | 2.8 |
| Melting point _____°C__ | 201 |
| Toughness _____ | 4.5 |

It will be noted that the viscosity, color, melting point, and toughness of the polystyrene has been very considerably improved by treating the crude styrene fraction with finely divided metallic sodium prior to polymerization.

*Example 3*

A sample of a crude light oil styrene fraction containing 99.0% by weight of monomeric styrene, obtained from light oil from oil gas by special methods was placed in an aluminum container, 1⅛" I. D. x 4¼" high, and placed in an oven heated to 115° C. until the sample boiled vigorously due to heat generated as the result of polymerization which required approximately 2 hours. The casting syrup then was poured into a second aluminum container, 1⅜" I. D. x 5" high, and heated for a period of 72 hours at a temperature of 120° C., then for 48 hours at 140° C., and finally for 12 hours at 65° C.

The aluminum container was stripped from the finished casting, which was approximately 2¾" high, exclusive of the pipe at the top of the casting. The diameter of the central part of the casting then was reduced to 0.750" for a distance of 1⅛". Two marks, exactly 0.625" apart, and extending completely around the casting, were inscribed in this reduced section. Holes perpendicular to the long axis of the casting, and at right angles to each other, were drilled through the opposite ends of the casting. Stirrups were placed in each of these holes and the piece then suspended in an electric oven from one stirrup, a weight equivalent to 9 pounds per square inch of cross sectional area being suspended from the other stirrup. For the present test piece, a four pound weight was required.

The sample then was heated to a temperature of 80° C. for a period of 24 hours, after which it was removed from the oven and the extent of elongation determined by making four measurements, one in each quadrant of the test piece, and averaging the readings obtained. The sample was found to have elongated 11.5% during the test period.

The sample again was placed in the oven, which was maintained at a temperature of 90° C., for a period of 24 hours. Upon removing from the oven, the sample was found to have been elongated to the extent of 47.2%.

Example 4

A 300 cc. (270 gram) portion of the 99% styrene fraction used in Example 3, and containing 0.053% (0.143 gram) of phenylacetylene, was placed in a 500 cc. round bottom flask maintained at a temperature of −33° C., after which 30 cc. of liquid ammonia was added and the whole agitated vigorously.

The above quantity of phenylacetylene requires 0.032 gram of metallic sodium to effect its complete removal. One gram of sodium was used, however, in order to remove other impurities present, such as colored compounds.

The sodium was added to the styrene-liquid ammonia mixture with good agitation, after which it was stirred for an additional period of 5 minutes. The mixture then was warmed to a temperature of 25° C. and the styrene distilled under reduced pressure. The purified styrene obtained was clear, sparkling, and water-white in color. The phenylacetylene content was reduced to less than 0.001%, and all colored and color-forming compounds were eliminated completely.

Losses due to the removal of undesired compounds, distillation, and handling amounted to 15 cc., equivalent to 5% of the original volume.

A portion of the treated sample then was polymerized and tested in a manner similar to that described in Example 3. The sample had an elongation of 0.2% at 80° C., 10.2% at 90° C., and 11.7% at 100° C. It will be noted that the elongations secured at the respective temperature levels are considerably less than those obtained at the corresponding temperature levels in the preceding example.

Example 5

A 4000 cc. (360 gram) portion of the same 66.3% crude styrene fraction used in Example 1 was placed in a 5 liter three-neck flask fitted with an efficient stirring device. The sample contained 35.3 grams of phenylacetylene, therefore, 7.96 grams of sodium would be required to completely remove the phenylacetylene present. The quantity actually used, however, was 16.0 grams in order to remove other undesirable impurities present also.

The sodium was dissolved in 160 cc. of liquid ammonia at a temperature of −33° C., after which the solution was slowly added to the styrene fraction at a temperature of 28° C. with good agitation. The ammonia vaporized immediately upon contacting the styrene fraction, resulting in the deposition of the sodium originally present in the liquid ammonia solution in the form of very finely divided particles in the styrene fraction.

The styrene fraction was distilled under reduced pressure, the distillate being clear, sparkling, and water-white in color. The phenylacetylene content of the distillate was less than 0.001%.

Losses due to the removal of undesirable impurities, distillation, and handling amounted to 200 cc. or 5% by volume of the original sample.

A portion of the refined sample was polymerized in a manner similar to that described in Example 1. The yield of polystyrene obtained was 94.5% by weight of the styrene present in the unpolymerized sample. The sample of polystyrene had the following physical properties:

| | |
|---|---|
| Viscosity _____centipoises__ | 48.0 |
| Color _____ | 1.7 |
| Melting point _____°C__ | 197 |
| Toughness _____ | 4.5 |

Example 6

A sample of a crude dark-colored styrene fraction obtained by the fractionation of light oil from oil gas, and containing 45.0% by weight of monomeric styrene and 2.09% by weight of phenylacetylene, was polymerized by heating for 10 days at a temperature of 100° C. in a sealed tube in an atmosphere of nitrogen. After removing unpolymerized material by distillation under reduced pressure, a sample of polystyrene representing 41.3% by weight of the monomeric styrene present in the original sample was obtained. This sample had the following physical properties.

| | |
|---|---|
| Viscosity _____centipoises__ | 4.5 |
| Color _____ | 3.0 |
| Melting point _____°C__ | 137 |
| Toughness _____ | 1.0 |

Example 7

A 455 cc. (410 gram) portion of the same crude light oil styrene fraction used in Example 6 was placed in a suitable vessel immersed in an oil bath maintained at a temperature of 50° C. The sample contained 8.6 grams of phenylacetylene, therefore, 1.94 grams of sodium is required for the complete removal of this constituent. A total of 10 grams was used, however, in order to effect the removal of other undesirable constituents.

The sodium was dispersed in boiling xylene with vigorous agitation in order to obtain it in the form of very finely divided particles, after which the xylene was decanted and the finely divided sodium added to the styrene fraction at 50° C. with good agitation. The reaction was continued for a period of 2 hours, after which the styrene fraction was filtered through glass wool in an inert atmosphere. Unreacted sodium and solid reaction products were thereupon removed.

The clarified solution then was distilled under reduced pressure. The distillate was clear, sparkling, and water-white in color and contained less than 0.001% of phenylacetylene.

Losses due to the removal of impurities, distillation, and handling amounted to 7.7% by volume of the original charge.

A portion of the refined sample was polymerized according to the procedure set forth in Example 6, the yield of polystyrene obtained being equivalent to 87.5% by weight of the monomeric styrene present in the sample taken for polymerization. The polystyrene sample had the following physical properties:

Viscosity _____ centipoises __ 42.4
Color _____ 1.0
Melting point _____ °C __ 192
Toughness _____ 4.5

Example 8

Approximately 4.0 grams of sodium was dissolved in 50 cc. of liquid ammonia and added gradually to 4000 cc. (3600 grams) of a 99.5% crude yellow styrene fraction at a temperature of 22° C. with good agitation. The styrene fraction contained, in addition to colored and color-forming compounds, 1.91 grams (0.053% by weight) of phenylacetylene, which would require 0.43 gram of sodium for its removal.

The reaction product was distilled under reduced pressure and washed to remove traces of ammonia, whereupon there was obtained 3900 cc. of a water-white styrene fraction containing less than 0.001% of phenylacetylene. Losses due to the removal of undesirable constituents, distillation, and handling amounted to 100 cc., or 2.5% by volume of the original charging stock.

Upon polymerizing a sample of the refined styrene fraction, a water-white, crystal clear sample of polystyrene was obtained. The product had a high melting point and possessed excellent electrical and mechanical properties.

Example 9

A 350 cc. portion of a crude, yellow 99.5% styrene fraction was treated with 2 grams of very finely divided sodium with good agitation at a temperature of 46° C. during a period of one hour, followed by the addition of a second portion of finely divided sodium, amounting to one gram, during an additional period of one hour. The finely divided sodium was prepared previously by the addition of metallic sodium to boiling xylene with good agitation, followed by the removal of the xylene by decantation.

The styrene sample used weighed approximately 325 grams and contained, in addition to certain colored and color-forming compounds, 0.17 gram (0.053% by weight) of phenylacetylene. Approximately 0.038 gram of sodium would be required for the removal of the phenylacetylene present. The quantity of sodium used, therefore, was 78.9 times the quantity required to remove the phenylacetylene present.

The treated fraction was filtered through glass wool in an inert atmosphere in order to remove unreacted sodium and solid sodium reaction products, followed by distillation at reduced pressures. A clear, sparkling, water-white styrene fraction containing less than 0.001% phenylacetylene was obtained. Losses due to the removal of impurities distillation, and handling amounted to 28 cc., or 8.0% by volume of the original starting material.

A portion of the refined styrene was polymerized, resulting in the production of a colorless, high melting sample of polystyrene possessing excellent electrical and mechanical properties.

Example 10

A sodium-lead alloy was prepared by melting together 100 parts by weight of lead and 12 parts by weight of sodium in a covered iron crucible with good agitation. After cooling to room temperature, the alloy was powdered in a mortar.

A 10 gram portion of the powdered sodium-lead alloy was added to 300 cc. (270 grams) of a crude, yellow, light oil styrene fraction containing 65% by weight of monomeric styrene at a temperature of 50° C. with good agitation, and the reaction continued for a period of several hours. The phenylacetylene present, as well as the colored and color-forming compounds, were removed to a substantial extent by this treatment.

Example 11

A sample of the same light oil styrene fraction used in Example 10 was placed in an autoclave and a small quantity of sodium dissolved in liquid ammonia was added with vigorous agitation during a period of one hour at room temperature. The pressure on the system then was released and the major portion of the ammonia removed.

The product was distilled under reduced pressure, after which the distillate was washed with water to remove traces of ammonia. The refined styrene obtained was clear, sparkling, and water-white in color. It contained less than 0.001% phenylacetylene.

Upon polymerizing a sample of the refined styrene fraction, and removing unpolymerized material by distillation under reduced pressure, there was obtained a colorless sample of polystyrene having a relatively high melting point and possessing excellent electrical and mechanical properties.

Example 12

A sample of the same light oil styrene fraction used in Example 10 was treated with a small quantity of finely divided sodium obtained by forcing molten sodium through an orifice under pressure. The styrene fraction was agitated continuously during this period.

The treated sample was distilled under reduced pressure, whereupon the refined styrene was obtained in good yield. The purified styrene fraction was clear and colorless, and contained less than 0.001% phenylacetylene.

A portion of the refined styrene fraction was polymerized by the application of heat. The polystyrene obtained was colorless and possessed excellent electrical and mechanical properties.

Example 13

A three hundred pound portion of the styrene fraction used in Example 1 was treated with three pounds of sodium dissolved in liquid ammonia, the reaction being carried out at room temperature. The liquid ammonia volatilized upon contacting the styrene, whereupon the sodium was deposited throughout the styrene fraction in the form of very finely divided particles. The addition was carried out during the course of three hours, during which the mixture was agitated vigorously.

The reaction vessel then was heated to remove residual ammonia, after which the treated fraction was distilled under reduced pressure in an aluminum distillation unit. The refined sample was clear and water-white in color, and contained less than 0.001% of phenylacetylene.

A five gallon sample of the refined styrene fraction was polymerized by heating for 7 days at a temperature of 90° C., two days at a temperature of 100° C., and one day at a temperature of 145° C., the whole process being carried out in an inert atmosphere. The polystyrene present in the polymerized solution was precipitated by the addition of alcohol, after which the alcohol and residual solvent was removed by heating under reduced pressure. The polystyrene obtained was clear and colorless, and possessed excellent electrical and mechanical properties.

*Example 14*

A solution of one gram of lithium in 30 cc. of liquid ammonia was gradually added to a 300 cc. (270 gram) sample of a crude light oil styrene fraction containing 50.5% by weight of monomeric styrene with vigorous agitation. The crude styrene fraction was yellow in color and contained 0.38% of phenylacetylene.

The treated sample was distilled under reduced pressure, whereupon there was obtained 280 cc. (252 grams) of a clear, sparkling, water-white styrene fraction containing less than 0.001% of phenylacetylene. Losses due to the removal of undesired impurities, distillation, and handling amounted to 6.7% of the original sample taken.

*Example 15*

A solution of 5 grams of potassium in 50 cc. of liquid ammonia was added gradually to 270 grams (300 cc.) of a 50.5% yellowish-brown light oil styrene fraction at a temperature of 25° C. The styrene fraction contained 0.38% by weight of phenylacetylene, as well as colored and color-forming compounds, and other impurities.

The treated styrene fraction was distilled under reduced pressure, whereupon there was obtained 260 cc. of a water-white styrene fraction containing less than 0.01% of phenylacetylene. Losses due to the removal of undesired impurities, distillation, and handling amounted to 13.3%.

*Example 16*

A solution of 4 grams of calcium in 60 cc. of liquid ammonia at a temperature of −33° C. was gradually added to 300 cc. of a crude 50.5% light oil styrene fraction containing 0.38% by weight of phenylacetylene, as well as substantial quantities of colored compounds, at a temperature of 25° C.

The treated sample was distilled under a pressure equivalent to 3 mm. of mercury, absolute, whereupon there was obtained 280 cc. of a water-white, refined styrene fraction containing less than 0.01% phenylacetylene. Losses due to the formation of sodium reaction products, distillation, and handling amounted to 6.7%.

*Example 17*

A solution of 5 grams of barium in 60 cc. of liquid ammonia at a temperature of −33° C. was gradually added to 300 cc. of a crude, yellow light oil styrene fraction containing 50.5% styrene and 0.43% phenylacetylene with good agitation.

The treated fraction was distilled under reduced pressure, whereupon there was obtained 275 cc. of a water-white distillate containing less than 0.01% of phenylacetylene. Losses due to the removal of undesired constituents, distillation, and handling amounted to 8.3%.

*Example 18*

A solution of 4 grams of strontium in 60 cc. of liquid ammonia at a temperature of −33° C. was gradually added, with stirring, to 300 cc. of a crude, yellow stryrene fraction containing 0.43% of phenylacetylene.

The reaction product was distilled under reduced pressure, resulting in the isolation of 275 cc. of a water-white, refined styrene. Losses due to the removal of undesired impurities, distillation, and handling amounted to 8.3% by volume of the original charging stock. In addition to the removal of all colored and color-forming compounds, the phenylacetylene content of the fraction was reduced from 0.43% to less than 0.01%.

*Example 19*

A 0.1 gram portion of metallic sodium was added to a mechanically stirred mixture of 0.03 gram of powdered ferric nitrate (Fe(NO$_3$)$_3$.H$_2$O) in 50 cc. of liquid ammonia in a round bottom flask. Dried air was bubbled through the solution until the blue color was discharged. A 2.5 gram portion of metallic sodium then was added to the reaction mixture in small pieces and the mixture stirred until the blue color was completely discharged.

This solution of sodamide in liquid ammonia was added to 300 cc. of the same crude styrene fraction used in Example 15 at a temperature of −33° C. with good agitation. The mixture was agitated for an additional period of one hour during which the liquid ammonia present was completely volatilized. The color of the styrene fraction changed from yellow to a deep brown, and a voluminous red precipitate was formed.

The reaction product was distilled, whereupon a clear, sparkling, water-white product containing less than 0.01% phenylacetylene was obtained.

*Example 20*

A 600 cc. portion of a crude yellow-brown light oil styrene fraction containing 2.27% of phenylacetylene was reacted with 13 grams of sodium methylate for a period of 2 hours at a temperature of 50° C. After distillation of the treated fraction, there was obtained a straw colored styrene fraction containing only 1.9% of phenylacetylene. The treating losses amounted to 1.9% by volume of the original styrene fraction.

As pointed out previously, very finely divided metals in group IA and IIA of the periodic table, namely, lithium, sodium, potassium, rubidium, caesium, barium, strontium, and calcium, or mixtures containing one or more of these materials may be used for refining impure styrene fractions, particularly those obtained from light oil. Due to the availability and low cost of sodium and potassium, however, these metals are preferred for the use set forth herein.

Alloys of these metals also may be used, such as NaPb$_{10}$, NaHg$_4$, NaCa$_5$, NaZn$_{12}$, KNa, and the like. In general, the alloys of the respective metals react with the impurities present in crude styrene fractions at a slower rate than the corresponding metals.

Hydrides of these metals, such as LiH, NaH, KH, RbH, and CsH, as well as other reactive compounds such as sodium methylate, also may be used for refining crude styrene fractions. The hydrates are prepared by heating the desired metal in an atmosphere of hydrogen.

In general, therefore, it may be said that very finely divided metals in group IA and IIA of the periodic table, their solutions and alloys, and reactive derivatives thereof, may be used to refine styrene fractions.

Due consideration must be given to the fact that the majority of these metals, alloys, and compounds are active catalysts for the polymerization of styrene. Consequently, great care must be exercised in order to operate the process within well defined limits in order to effect the removal of the impurities present without polymerizing excessive quantities of the monomeric styrene present in the crude fraction treated.

The most important of these reaction variables are (1) degree of subdivision of the treating agent, (2) concentration of the styrene fraction treated, (3) quantity of sodium, or other reactive metal, alloy, or compound, used (4) reaction temperature, (5) quantity and type of impurities present in the styrene fraction, (6) method of applying the sodium, or other metal or compound, to the styrene fraction, (7) speed of agitation, and (8) reaction time.

In view of the extreme difficulty in exactly delimiting each variable in the wide variety of possible combinations of the foregoing eight variables, resort will be had to an expression for reaction conditions which will be well understood by persons skilled in the art upon becoming familiar with this invention. It may be said that treating conditions should be such, having in mind what has been said with respect to the above variables, as to avoid a substantially large polymerization of the styrene under treatment. In other words the styrene is treated under reaction conditions insufficiently severe to polymerize a large part thereof during treatment.

Once knowing what the variables in treating conditions are and the effect of such variables, it is relatively simple for the person skilled in the art upon becoming familiar with this invention to control his reaction conditions to avoid unnecessary polymerization of the styrene undergoing treatment.

Undoubtedly, the most important of these reaction variables is the degree of subdivision of the treating agent. As pointed out previously, satisfactory results are obtained only when the treating agent is very finely divided or is used in the form of a solution in a suitable solvent. While it is difficult to assign a definite size above which it may be said that the respective metals are inefficient, it has been found that when the degree of subdivision is such that the major portion of the powdered metal is comprised of particles smaller than $\frac{1}{32}$" in diameter, excellent results are obtained.

Almost any desired method may be employed in the preparation of such finely divided metals. Thus, metallic sodium may be (1) dispersed in hot xylene, paraffin, or other inert organic material with vigorous agitation, (2) sprayed through suitable orifices or nozzles, (3) extruded through very fine orifices, (4) dissolved in a solvent such as liquid ammonia, followed by the volatilization of the ammonia, or (5) an arc may be generated between sodium electrodes in an inert liquid.

Styrene fractions containing from 1% to 99.9% monomeric styrene may be treated by the method described herein to produce water-white refined fractions possessing only traces, or none, of undesired impurities, such as phenylacetylene, color, and color-forming bodies. Fractions containing at least 30% styrene are preferred particularly when the monomer is to be converted into polystyrene. For this purpose a styrene fraction of at least 50% is particularly preferred. While the boiling range of extremely dilute styrene fractions may cover a fairly wide range, boiling ranges between approximately 125° to 165° C. and more especially between approximately 135° and 155° C. are preferred. Narrower fractions such as between approximately 140° C. and 150° C. are particularly desirable. Extremely dilute fractions may be employed in some instances such as when it is desired to react styrene with some other compound in which case my treatment serves to purify such styrene for reaction purposes. Certain precautions, however, should be observed, particularly in the case of styrene fractions containing high concentrations of monomeric styrene. As the styrene present in fractions containing high concentrations of monomeric styrene has a pronounced tendency to polymerize in the presence of sodium, or certain of the other treating agents, alloys, or compounds, particularly when such materials are in very finely-divided form, certain precautions with respect to reaction temperature and time should be observed with such fractions in order to prevent undue polymerization thereof, as will be more particularly described hereinafter.

The desired quantity of sodium or other reactive metal or alloy for the removal of undesired impurities from styrene fractions will vary considerably with the concentration of the fraction and the type and concentration of the impurities present. Thus, in fairly dilute fractions it will be found that from two to five times the theoretical quantity of sodium to react with the phenylacetylene present usually will be sufficient to refine the sample to the desired extent. In the case of very concentrated fractions, however, such as those containing 98–99.9% styrene, this ratio may be increased to 30 or even 80 times the quantity required to react with the phenylacetylene present.

The reaction temperature may vary from very low temperatures, such as −33° C. and lower which is the boiling point of ammonia up to moderately high temperatures, such as 60° C. However, a safe upper limit to preclude excessive polymerization of styrene is 50° C., and this is preferably reduced to 30° C. in the case of very concentrated styrene fractions.

The desired quantity of sodium or other active metal to be used to refine a given styrene fraction is determined in large measure by the type and quantity of impurities present. In most cases, however, the quantity of phenylacetylene found in a given sample may be taken as a measure of the total impurities present. As pointed out previously, the amount of sodium to be used may be varied such as from two to eighty times the quantity required to remove the phenylacetylene, the exact amount preferably used being dependent largely upon the concentration of styrene in the fraction.

The method of applying the active metal has a considerable influence upon the rapidity with which the impurities are removed. Thus, the use of a solution of sodium in liquid ammonia will be found to almost instantaneously remove the impurities from a given styrene fraction due to the molecular dimensions of the individual sodium particles and to the intimate contact between the two phases. The addition of metallic sodium to an emulsion of styrene in liquid ammonia produced for example by rapid agitation of the two components also is particularly effective.

The speed of agitation has a very profound bearing upon the rate of removal of impurities from styrene. In general, it may be said that the rate of removal of such impurities varies directly with the speed of agitation employed.

The time of reaction is an important variable in the removal of impurities from styrene. As pointed out previously, all of the treating agents described are good catalysts for the polymerization of monomeric styrene. Consequently, care should be exercised not to exceed certain definite reaction periods in order to prevent any undue loss of styrene in the form of polystyrene.

Generally speaking, it may be said that the time of reaction may vary from a few seconds to several hours, depending mainly upon the concentration of the styrene fraction being treated and the reaction temperature. Thus, with very dilute styrene fractions, say 30–50% concentration, and relatively low reaction temperatures, say 25° C., a reaction time of from three to seven hours normally may be employed without undue loss of styrene.

With highly concentrated styrene fractions, say from 98 to 99.9% concentration, and fairly low reaction temperatures, say from 0 to 20° C., reaction times ranging from several seconds to one hour may be employed.

An increase in the reaction temperature employed in the foregoing illustrations is preferably met with a corresponding reduction in the reaction time in order to prevent excessive polymerization.

The prevention of excessive polymerization also prevents excessive reduction of the styrene to ethyl benzene in the case of those metals which are capable of causing reduction for example when in solution in ammonia.

As previously stated, a metal selected from group IA and group IIA of the periodic system, including lithium, sodium, potassium, rubidium, caesium, barium, strontium, and calcium, as well as active alloys and compounds containing one or more of such metals as an essential ingredient may be employed to refine styrene.

In the claim the term "metals" is intended to include metals and alloys.

In the specification and in the claim the following terms have the following meanings.

The term "finely divided" is intended to mean a material reduced to such a state of fineness that the preponderating part is composed of particles having a diameter of less than $\frac{1}{32}''$, as well as materials in the colloidal or dissolved form.

While reagents and procedures of a particular nature have been specifically described, it is to be understood that these are by way of illustration only. Therefore, changes, omissions, additions, substitutions, and/or modifications might be made within the scope of the claim without departing from the spirit of the invention.

I claim:

A process for purifying styrene in admixture with phenyl acetylene which comprises emulsifying said contaminated styrene with liquid ammonia by rapid agitation, adding to the agitated emulsion finely divided sodium under temperature conditions between —33° and 50° C. and under other conditions insufficiently drastic to polymerize a large part of said styrene, and separating styrene from the resulting mass less contaminated with phenyl acetylene.

CLAUDE W. JORDAN.

REFERENCES CITED

The following references are of record in the file of this patent:

UNITED STATES PATENTS

| Number | Name | Date |
|---|---|---|
| 1,763,410 | Schroeter | June 10, 1930 |
| 1,939,839 | Williams et al. | Dec. 19, 1933 |
| 1,541,176 | Ostromislensky | June 9, 1925 |
| 2,110,830 | Dreisbach | Mar. 8, 1938 |
| 2,230,274 | Soday | Feb. 4, 1941 |

FOREIGN PATENTS

| Number | Country | Date |
|---|---|---|
| 264,245 | Germany | Sept. 9, 1913 |

OTHER REFERENCES

Groll et al., Jour. Ind. Eng. Chem., vol. 25, 784–97 (1933) Pat. Off. Lib.